(12) United States Patent
Tilander

(10) Patent No.: US 10,738,944 B2
(45) Date of Patent: Aug. 11, 2020

(54) SYSTEM FOR DRAINING AND REFILLING CRYOGENIC FUEL IN A VEHICLE TANK

(71) Applicant: VOLVO TRUCK CORPORATION, Göteborg (SE)

(72) Inventor: Mikael Tilander, Mölnlycke (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 812 days.

(21) Appl. No.: 15/302,537

(22) PCT Filed: Apr. 9, 2014

(86) PCT No.: PCT/SE2014/000045
§ 371 (c)(1),
(2) Date: Oct. 7, 2016

(87) PCT Pub. No.: WO2015/156709
PCT Pub. Date: Oct. 15, 2015

(65) Prior Publication Data
US 2017/0030524 A1    Feb. 2, 2017

(51) Int. Cl.
*F17C 7/02* (2006.01)
*B60S 5/02* (2006.01)
(Continued)

(52) U.S. Cl.
CPC .............. *F17C 7/02* (2013.01); *B60S 5/02* (2013.01); *F17C 7/00* (2013.01);
(Continued)

(58) Field of Classification Search
CPC ...... F17C 7/00; F17C 7/02; F17C 9/02; F17C 2223/033; F17C 2225/0161;
(Continued)

(56) References Cited

U.S. PATENT DOCUMENTS 3,946,572 A    3/1976  Bragg
4,380,242 A *  4/1983  Bresie ................ F17C 7/00
                                                                    137/113
(Continued)

FOREIGN PATENT DOCUMENTS

CN    1443964 A     9/2003
DE    19704361 C1   1/1996
(Continued)

OTHER PUBLICATIONS

DE19704361 Machine Translation (Year: 1998).*
(Continued)

*Primary Examiner* — Gordon A Jones
(74) *Attorney, Agent, or Firm* — Withrow & Terranova, PLLC

(57) ABSTRACT

A tool for draining and refilling a vehicle tank for cryogenic fuel, wherein the tool when in position for use has a vertical direction and includes a heat exchanger and a cooling tank, the cooling tank having an upper portion and a lower portion as viewed in the vertical direction of the tool and including a fuel outlet having at least one outlet valve, the fuel outlet being connected to a first fuel conduit and second fuel conduit via the at least one outlet valve, wherein the first fuel conduit includes an arrangement for connecting the first fuel conduit to an inlet on the heat exchanger, and wherein the second fuel conduit includes an arrangement for connecting the second fuel conduit to an inlet on a vehicle tank, the cooling tank further including an inlet, the inlet being connected to a fuel inlet conduit via a check valve and the fuel inlet conduit including an arrangement for connecting the inlet to an outlet from the heat exchanger, or to an outlet from a vehicle tank, and the outlet of the heat exchanger including an arrangement for connecting to an inlet on a (Continued)

vehicle tank, and a system and method for draining and refilling a vehicle tank.

10 Claims, 3 Drawing Sheets

(51) Int. Cl.
F17C 7/00 (2006.01)
B60K 15/03 (2006.01)

(52) U.S. Cl.
CPC .............. B60K 2015/03315 (2013.01); B60K 2015/03473 (2013.01); F17C 2205/0352 (2013.01); F17C 2205/0355 (2013.01); F17C 2221/033 (2013.01); F17C 2223/0161 (2013.01); F17C 2223/033 (2013.01); F17C 2225/0161 (2013.01); F17C 2225/033 (2013.01); F17C 2225/035 (2013.01); F17C 2227/0107 (2013.01); F17C 2227/0302 (2013.01); F17C 2227/0393 (2013.01); F17C 2265/032 (2013.01); F17C 2265/065 (2013.01); F17C 2270/0171 (2013.01); F17C 2270/0176 (2013.01); F17C 2270/0178 (2013.01)

(58) Field of Classification Search
CPC .......... F17C 2225/033; F17C 2225/035; F17C 2227/0107; F17C 2227/0393; F17C 2265/032; F17C 2265/065; F17C 2270/0171; F17C 2270/0176; F17C 2270/0178; F17C 2221/033; B60S 5/02; B60K 2015/03315; B60K 2015/03473

See application file for complete search history.

(56) References Cited

U.S. PATENT DOCUMENTS

| 4,706,929 | A | * | 11/1987 | Kalaskie | F16K 1/305 137/316 |
| 5,525,093 | A | * | 6/1996 | Palmer, Jr. | B24C 1/003 134/7 |
| 2001/0052241 | A1 | * | 12/2001 | Jain | F25J 3/0209 62/621 |
| 2002/0083719 | A1 | | 7/2002 | Hughes et al. | |
| 2005/0132719 | A1 | * | 6/2005 | Svensson | F17C 5/02 62/50.1 |
| 2006/0218941 | A1 | | 10/2006 | Drube | |
| 2008/0134693 | A1 | * | 6/2008 | Harper | F17C 1/12 62/50.7 |
| 2009/0107577 | A1 | * | 4/2009 | Allidieres | F17C 5/007 141/1 |
| 2011/0114203 | A1 | * | 5/2011 | Mazzoni | F15B 13/024 137/514 |
| 2016/0265478 | A1 | * | 9/2016 | Oversby | F17C 7/02 |

FOREIGN PATENT DOCUMENTS

| DE | 10247505 A1 | 5/2004 |
| WO | 2013075243 A1 | 5/2013 |

OTHER PUBLICATIONS

Chinese Official Action (dated May 3, 2018) for corresponding Chinese Application 201480077858.6.
European Official Action (dated Oct. 18, 2017) for corresponding European App. 14889003.1.
International Search Report (dated Sep. 1, 2015) for corresponding International App. PCT/SE2014/000045.

* cited by examiner

SYSTEM FOR DRAINING AND REFILLING CRYOGENIC FUEL IN A VEHICLE TANK

BACKGROUND AND SUMMARY

The present invention relates to a tool, a system and a method for draining and refilling cryogenic fuel in a vehicle tank.

The invention can be applied to commercial vehicles, such as trucks, buses and work vehicles. Although the invention is described with reference to commercial vehicles, the invention is not limited to this type of vehicles, but can also be used on other vehicles such as work machines, e.g. excavators.

It is common knowledge within the field that work with cryogenic gases poses a fire hazard, since the gases may be highly flammable. When using cryogenic fuel as a power fuel in commercial vehicles, any shop work, such as service or repair of the vehicle, results in increased safety risks. During repair or service potentially fire-causing equipment may be used, and in some cases flaming may be caused, e.g. by arc welding. Therefore, in order to minimize the risks when working on commercial vehicles of this kind, the cryogenic fuel has to be removed from the fuel tank before starting the work in the workshop.

Draining a tank of cryogenic fuel is associated with difficulties, since the temperature has to be very low to keep the fuel in liquid form, at least down by −160 degrees relative to the temperature of the surroundings. Accordingly, the draining of the tank should be done while maintaining the low temperature of the fuel. If the temperature is raised, the fuel is transformed into gaseous form, which means that the volume is increased considerably.

In the current solutions, servicing on commercial vehicles is often preceded by allowing the fuel to transform into gaseous form via a conduit connected to the fuel tank and causing it to burn off at the outlet of the conduit. This procedure is time-consuming, since it may take several hours to burn off a few litres of fuel in liquid form. Furthermore, the flame has to be monitored while burning, since the risk of accidents is obvious. Consequently, this is both time and work consuming. Also, the procedure has to be carried out under protected conditions and while observing safety regulations, which can be problematic.

For example, it may be associated with difficulties to find the right safety distance in the area adjacent to a workshop.

In addition, when letting the fuel burn off, it represents a waste of resources since the fuel goes completely to waste.

US20220083719A discloses a delivery tank, which transfers fluid from a delivery tank to a customer tank while maintaining a pressure in the delivery tank and while a pump pumps fluid from the delivery tank. Furthermore, a piping system passing the fluid to the customer tank is provided. A diverter diverts the pumped fluid and a heat exchanger heats or cools that portion of the fluid before it is returned to the delivery tank. A sensor controls how the heat is to be distributed in that portion of the fluid.

Although it may work to handle fuel which has to be removed, for example before service work, by burning it off, as is evident from the foregoing there are still shortcomings and problems with respect to how the fuel is handled and recovered in the handling process, as well as from a safety point of view.

It is therefore desirable to provide a tool, a system and a method having an improved function with regard to draining and refilling cryogenic fuel in a vehicle tank.

It is desirable to produce a tool, a system and a method for enabling emptying and refilling of cryogenic fuel in a vehicle, such as a commercial vehicle.

The herein described tool for draining and refilling a vehicle tank for cryogenic fuel is characterized in that the tool when in position for use has a vertical direction and comprises a heat exchanger and a cooling, tank, said cooling tank having an upper portion and a lower portion as viewed in the vertical direction of the tool and comprising an outlet having at least one outlet valve, said outlet being connected to a first fuel conduit and a second fuel conduit via said at least one outlet valve, wherein the first fuel conduit comprises means for connecting the first fuel conduit to an inlet on the heat exchanger, and wherein the second fuel conduit comprises means for connecting the second fuel conduit to an inlet on a vehicle tank, and wherein the cooling tank further comprises an inlet, said inlet being connected to a fuel inlet conduit via a check valve, and that the fuel inlet conduit comprises means for connecting the inlet to an outlet from the heat exchanger, or to an outlet from a vehicle tank, and that the outlet of the heat exchanger comprises means for connecting to an inlet on a vehicle tank.

The heat exchanger can be provided with means for connecting the inlet of the heat exchanger to a fuel outlet on a vehicle tank. The expression 'means for connecting' refers to all necessary connecting devices, valves, pipes and hoses required for establishing a functional connection between two elements, for example two tanks, or a tank and a heat exchanger.

For reasons of simplicity, equipment that is necessary for connecting the tool to a vehicle tank and that is normally not on board a vehicle when it is in operation, such as valves, connectors, hoses, etc., are regarded as parts of the tool when the tool is set up in a transfer system, as is described in the following. Such equipment, however, is constituted of easily replaceable standard components, which should not be regarded as limiting to the tool. Accordingly, any suitable connecting devices, valves, pipes and hoses required for establishing functional connections in the fuel transfer system described in the following can be used.

The outlet valve of the tool can be disposed on an outlet conduit emanating from the outlet on the cooling tank of the tool. The outlet conduit divides into one branch constituting the first fuel conduit and one branch constituting the second fuel conduit. The branching point is located downstream of the outlet valve, as viewed in the direction from the outlet in the cooling tank.

The check valve that is disposed on the fuel inlet conduit to the inlet of the cooling tank can be adapted to open at a predetermined back pressure front the cooling tank of from 12 to 24 bars, such as from 14 to 18 bars, preferably at a back pressure from the cooling tank of 16 bars. The check valve thus prevents fuel from being brought back out of the cooling tank through the fuel inlet conduit as long as the pressure in the cooling tank does not exceed the predetermined back pressure.

It may be convenient that the inlet to the cooling tank is placed above the outlet from the cooling tank in the vertical direction of the tool. In this way, removal of liquid fuel from the lower portion of the cooling tank, and supply of gaseous or liquid fuel to the upper portion of the cooling tank, are facilitated.

A spraying device can be connected to the inlet of the cooling tank inside the cooling tank. The spraying device is thereby adapted for spraying fuel into the upper portion of the cooling tank. For this purpose, the spraying device can be provided with one or several spray nozzles which, for example, can be disposed along a pipe extending into the cooling tank. The spraying device enables cryogenic fuel to be distributed into the cooling tank, whereby a rapid cooling of the walls of the cooling tank can be obtained in an initial stage when refilling fuel into the cooling tank, at which stage the cooling tank is empty or only contains a smaller amount of liquid fuel. In this way, unwanted vaporization of the liquid cryogenic fuel can be minimized.

Furthermore, a gas outlet can be disposed in the upper portion of the cooling tank. Such a was outlet can be connected to one or several gas outlet conduits via one or several valves. For example one gas outlet conduit can be provided with a safety valve, which is adapted to open automatically and then stay open at a predetermined highest allowable outlet pressure, for example 24 bars.

In spite of the use of insulated conduits for connecting cryogenic tanks to each other, and in spite of the fact that the tanks are insulated, the gaseous cryogenic fuel in the tanks can be transformed into gaseous form to some extent. As a result of this, an undesirably high overpressure can develop in both the vehicle tank and in the cooling tank of the tool.

It can therefore be desirable to provide the cooling tank with a relief valve, which is automatically opened and closed in response to the pressure inside the tank. The relief valve can suitably be adapted to regulate the pressure in the tank, for example to 14 to 18 bars, such as to 16 bars.

The gas outlet in the upper portion of the cooling tank can comprise a gas outlet conduit provided with an outlet valve, which is adapted to be opened and closed manually by means of a mechanical or electrical control means. With such a controllable valve, the pressure in the cooling tank can be adjusted manually to counteract the occurrence of an undesired pressure increase in the cooling tank, caused by vaporization of fuel injected into the cooling tank, which may occur especially in the beginning of a refilling process. During refilling of the cooling tank, it may be convenient if the pressure in the cooling tank is maintained around a predetermined value, for example 1 bar, by adjusting the outlet valve.

Accordingly, venting of excess gas is a suitable safety measure for regulating the pressure in the cooling tank of the tool. However, venting of fuel results in a waste of resources since valuable fuel is wasted. To make it possible to be able to utilize also the vented gas, the draining and refilling system can comprise means for returning the vented gas to the cooling tank at a suitable time. Alternatively, the vented gas can be passed to the vehicle tank or to both tanks. Returning vented gas to one or both tanks means that the fuel does not go to waste, but is recovered for use as vehicle fuel. However, the return of fuel must be done in a controlled manner so that the pressure is maintained below a predetermined upper value in the tanks, in order to prevent an excessive overpressure from developing. It is of course also possible to collect the vented gas and use it for other purposes.

The tool described herein can advantageously be portable. In that case, a portable tool, for example, has a size enabling it to be moved by a conventional pallet lifter. A cooling tank of a portable size can, for example, have an internal volume of 300 L to 700 L. It may be advantageous if the cooling tank of the tool holds at least 450 L, preferably at least 550 L, since in that case it is possible to transfer the contents of a fully loaded common-sin vehicle tank to the cooling tank of the tool. Furthermore, the tool can be designed such that the cooling tank and the heat exchanger are separate pans which can be disconnected and stored and moved independently of each other.

Also, a system for draining and refilling a vehicle tank for cryogenic fuel is provided. The system comprises the herein described tool, and a vehicle tank for cryogenic fuel placed on board a vehicle, wherein the fuel tank when in position for use has a vertical direction and exhibits an upper portion and a lower portion as viewed in the vertical direction, and wherein the vehicle tank comprises an outlet for fuel, and an inlet for fuel.

The system for draining and refilling a vehicle tank can comprise an additional cooling tank, said cooling tank exhibiting an outlet for fuel, and an inlet for fuel, as well as connecting means for connecting the outlet and the inlet, respectively, to the other components in the system. As has been described for the inlet and outlet of the cooling tank of the tool, also the inlet of the vehicle tank and/or of any other cooling tanks included in the system are placed above the outlet from the cooling tank, in the vertical direction.

Furthermore, also the vehicle tank and/or any additional cooling tanks included in the system can be provided with a gas outlet having one or several gas conduits and valves in an upper portion of the tank, in the same way as has described for the cooling tank of the tool.

Some long distance haulage vehicles are equipped with extra-large fuel tanks. For instance, when servicing these, the tank could hold so much fuel that the cooling tank of the tool cannot hold the whole quantity of fuel. In such cases, it is advantageous to have access to extra volume for transferring fuel into. Also in a normal-size tank, problems may arise in that the cooling tank of the tool cannot hold a sufficient quantity of fuel. In order to alleviate this problem, the system may in that case comprise at least one additional temporary cooling tank.

There is also provided a method for transferring cryogenic fuel between two tanks for cryogenic fuel. The method thereby comprises the following steps:

A) providing a tool of the herein described kind comprising a cooling tank and a heat exchanger;

B) forming a system of the herein described kind by connecting the tool to a vehicle tank, wherein one of the vehicle tank and the cooling tank of the tool constitutes a supplying tank containing cryogenic, pressurized fuel for transfer to the other one of the vehicle tank and the cooling tank of the tool, which thereby constitutes a receiving tank;

C) transforming liquid cryogenic fuel into gaseous form by causing the liquid fuel to pass through the heat exchanger of the tool;

D) developing an expelling pressure in the supplying tank by injecting the fuel transformed in the heat exchanger; and E) transferring fuel from the supplying tank to the receiving tank, wherein the increased pressure in the supplying tank drives the transfer of fuel from the supplying tank to the receiving tank.

Accordingly, the herein described tool allows draining of any one of the vehicle tank and the tool tank into the other tank, which means that it is possible to first drain a vehicle tank of fuel, for example, before servicing the vehicle, and to thereupon return the fuel to the vehicle tank with one and the same tool. The switching between the two directions of draining is done by a simple changing over of hoses between the different inlets and outlets on the vehicle tank and the tool tank. The method is based on the fact that a portion of the liquid fuel present in the system is diverted to the heat exchanger where it is vaporized, whereupon the gaseous fuel is passed into the tank to be drained to increase the pressure and expel the fuel into the other tank.

If the vehicle tank is to be drained of fuel and, accordingly, is the supplying tank, the liquid cryogenic fuel in the vaporizing step C) can be taken from the vehicle tank via an outlet on the vehicle tank.

Alternatively, in that case, the receiving tank, i.e. the cooling tank of the tool can be filled with a small amount of liquid cryogenic fuel, wherein the liquid cryogenic fuel in step C) can be taken from the cooling tank of the tool via an outlet on the cooling tank of the tool.

In the case when the cooling tank of the tool is the supplying tank, the liquid cryogenic fuel in step C) can be taken from the cooling tank of the tool via an outlet on the cooling tank. In the case when the vehicle tank is to be refilled after a service operation, there is in general no liquid fuel in the vehicle tank that could be utilized in the method step C). If, however, the refilling takes place as a normal refuelling during use of the vehicle, there may still be some liquid fuel left in the vehicle tank. In such a case, this fuel can of course be used in the method step C).

The working pressure in the supplying tank can be from 2 to 7 bars, such as from 3 to 5 bars, or 3 bars, and the pressure in the receiving tank should be at least 1 bar lower than the pressure in the supplying tank, such as at least 2 bars lower than the pressure in the supplying tank.

The described tool makes it possible to quickly and efficiently drain the vehicle tank, for example, when servicing the commercial vehicle in a workshop, so that service work is enabled without an risk of ignition of the highly flammable cryogenic fuel. After completing the service work, the fuel can be returned to the tank after reversing the hoses as described herein, whereupon the workshop visit can be terminated. By means of insulated cooling tanks and possibly also insulated conduits, the temperature of the cryogenic fuel in gaseous form can be held below the boiling point of the fuel, for example below −163 degrees Celsius as the fuel primarily consists of methane.

Both draining of a vehicle tank and returning of cryogenic fuel to the vehicle tank can be carried out rapidly and smoothly and with high safety with the herein described tool. The entire process of draining the tank, including time for setup, takes about 30 minutes up to one hour. The refilling of the tank takes an equal amount of time. This should be compared to the hitherto used method for draining a tank of cryogenic fuel by burning off the fuel under constant supervision, a process which may take several hours if there is lot of fuel left in the tank to be drained. Accordingly, the herein described tool enables a considerable time saving, which of course greatly reduces the costs for vehicle servicing, both with regard to labour costs and with regard to the loss of income incurred when the vehicle is idle for a service operation. It is also important from a fuel economy point of view to reduce the time elapsing while the fuel is stored outside the vehicle, before it is returned to the vehicle for continued use. Even if the refrigerated, pressurized fuel is stored in insulated cooling tanks, the temperature in the tanks will rise over time and the fuel will gradually be transformed into gaseous form. For safety reasons, the excess of gas produced is vented from the tank gradually, which results in a loss of fuel increasing as time goes on, if not special measures are taken to recover the vented fuel.

Cryogenic fuels are fuels requiring storage and handling at extremely low temperatures to be kept in liquid form. One example of a cryogenic fuel is Liquefied Natural Gas (LNG) having a boiling point of about −163 degrees Celsius. Thus, good insulation of the fuel system is required when using LNG as fuel in a commercial vehicle. Transfer of LNG from a vehicle tank to a cooling tank is enabled by an insulated conduit between the tanks. In a system for draining and refilling a vehicle tank, the connections between the valves of the cooling tank and the valves of the vehicle tank can therefore be constituted by conduits that are insulated. The conduits can preferably also be flexible and be constituted, for example, by hoses. In order to keep the temperature down, insulated fuel tanks are advantageously used, and also the cooling tank is advantageously insulated. Conduits which are insulated with a sufficiently thick insulation and placed between the tanks will result in it becoming easier to maintain the extremely low temperature. Polyurethane foam is a suitable material for use as insulation. Another possibility is that ice formation due to the extremely low temperature serves as sufficient insulation.

The herein described tool and system for draining and refilling cryogenic fuel in a vehicle tank can also be convenient to use in situations outside a workshop. For instance, the tool can be useful in case of a traffic accident where a commercial vehicle is involved, where leaving the fuel in the vehicle tank poses a fire hazard. A large and unwieldy tank can cause inconveniences in workshops with insufficient space and cramped premises. There may also be situations where a vehicle tank is drained of cryogenic fuel to refill another vehicle tank with the same fuel. The tool can be portable to alleviate these situations. It is also possible to use two or more smaller tools for draining a vehicle tank and for temporarily storing the expelled cryogenic fuel until it can be returned to the vehicle tank.

A temporary tank provides a smooth solution for draining and refilling a vehicle tank in many situations. Another possibility is to drain several commercial vehicle tanks successively and to refill them with fuel from the temporary cooling tank after completing the work on the commercial vehicles.

It may also be convenient to be able to drain and refill the vehicle tank for example when driving. In such situations it may be convenient that the tool described herein has a fuel-filled cooling tank and accompanies the commercial vehicle in question, which can be refilled when temporarily stopped. To have a spare tank placed on board the commercial vehicle in this way provides a flexible vehicle with an environmentally friendly fuel supply. The tool with the portable cooling tank may then comprise means for attachment to the vehicle associated with the vehicle tank.

Placing the tool for draining and refilling cryogenic fuel near a user, such as a service technician, for example when servicing the commercial vehicle, facilitates the work and saves time and resources. Another possibility is therefore that the temporary cooling tank can be placed in a workshop, suitable for use in shop work.

As mentioned previously, cryogenic fuel is characterized by its low boiling point and can consist of various energy gas mixtures. The prerequisites for using a cryogenic fuel for vehicle propulsion may be varying. For instance, the availability of filling stations may vary between different geographical areas. Furthermore, the fuel equipment of different vehicles may differ, for example due to the fact that the vehicles are developing continually so that older model vehicles differ technically from newer vehicles. Also, the fuel consumption of a fully loaded vehicle is of course higher.

One commonly used cryogenic fuel is methane, which can be obtained from natural gas, or bio-gas. Natural gas is recovered from deposits on land or under the sea, and may have a methane content of between 70% and 99%. Bio-gas is produced from renewable organic material which is digested, and has a very high methane content of 95-99%.

The burning of methane produces primarily carbon dioxide and water. Since the methane in bio-gas, or Bio Liquid Gas (BLG), originates from the carbon dioxide in the air that has been stored in plants via photosynthesis, there is no net contribution of the greenhouse gas carbon dioxide to the atmosphere. Natural gas transformed into liquid form is usually called Compressed Natural Gas (CNG). The combustion of CNG, which is a fossil fuel, is certainly a cleaner fuel alternative than gasoline and diesel, but the carbon dioxide produced makes a contribution to the greenhouse gases in the atmosphere. Naturally, it is possible to use mixtures of BLG and CNG as vehicle fuel.

When the gas transforms into liquid, the volume decreases substantially, for example, 1 m3 of CNG corresponds to about 1.6 dm3 of LNG, which makes it advantageous to transport the fuel when it is in liquid form. Accordingly, one truck transporting the fuel in liquid form may correspond to a large number of trucks with fuel in gaseous form. Furthermore, it is space saving to have the cryogenic fuel in liquid form in the fuel tanks of the commercial vehicles. Since the tanks as such have a predefined volume, which is also the case with the storage tanks on commercial vehicles transporting fuel, the amount of fuel in the vehicle can be determined. This means that it is known in advance how far the truck can drive on its tank and enables planning for arriving at the next filling station in time. In addition, costs can be planned as the tank volume is known.

The cooling tank of the herein described tool can contain a predefined amount of fuel (LNG). This fuel can be used for transferring into gaseous form, and then be passed into the tank of the vehicle, where the gaseous filet is used for building up an overpressure, which expels the liquid fuel from the vehicle tank to the cooling tank of the tool. Alternatively, the tool can be connected to the vehicle tank in such a way that liquid fuel, at least initially, is taken from the vehicle tank and is transformed into gaseous form in the heat exchanger of the tool, whereupon the now gaseous fuel is returned to the vehicle tank, where it produces an overpressure in the vehicle tank, so that the major part of the liquid fuel in the vehicle tank can be expelled to the cooling tank of the tool. The cooling tank of the tool should have a lower pressure than the pressure in the vehicle tank during the transfer of liquid fuel from the vehicle tank to the cooling tank of the tool. A suitable working pressure in the vehicle tank can then be from 2 to 7 bars, such as 3 to 5 bars, for example about 3 bars. The pressure in the receiving tank should then be at least 1 bar lower than in the vehicle tank, such as at least 2 bars lower.

The vehicle tank can be drained completely of liquid fuel (LNG), but gas should be left in the tank to prevent air from entering the tank. Problems may arise when air enters the cold vehicle tank, since air contains water. At the low temperature prevailing in the tank, water crystals are formed which ruin the system. Therefore, the tank is filled with nitrogen gas, which is inert, during cleaning of the tank or complete draining of the tank.

The location should be considered from a safety standpoint when using and storing cooling tanks for cryogenic fuel. Compressed cryogenic and liquid gases heavier than air should be placed bearing in mind the dangers associated with accumulation of the gases in lying spots such as drains, basements and pipelines. The gas is heavier than air up to −107 degrees, at higher temperatures the gas is lighter than air and rises and mixes with the air, which increases the risk of ignition.

For space saving purposes, and since the tool described is not always in use, it should not be bulky in size. If one or several complementary cooling tanks are provided, it can be assumed that such extra cooling tanks are used less frequently, for which reason it may be suitable that an extra cooling tank is small volume-wise and thus occupies little space during storage. For this reason, this at least one additional cooling tank can be smaller than the first cooling tank of the tool.

BRIEF DESCRIPTION OF DRAWINGS

In the following, the invention will be described more closely with reference to the attached drawings. In the figures, identical or similar details are indicated with the same reference numerals. The figures are only schematic representations and are not intended to show exact details of the invention. The flames are solely intended to illustrate typical embodiments of the invention, and should therefore not be regarded as limiting for the invention.

DETAILED DESCRIPTION

Figure 1:
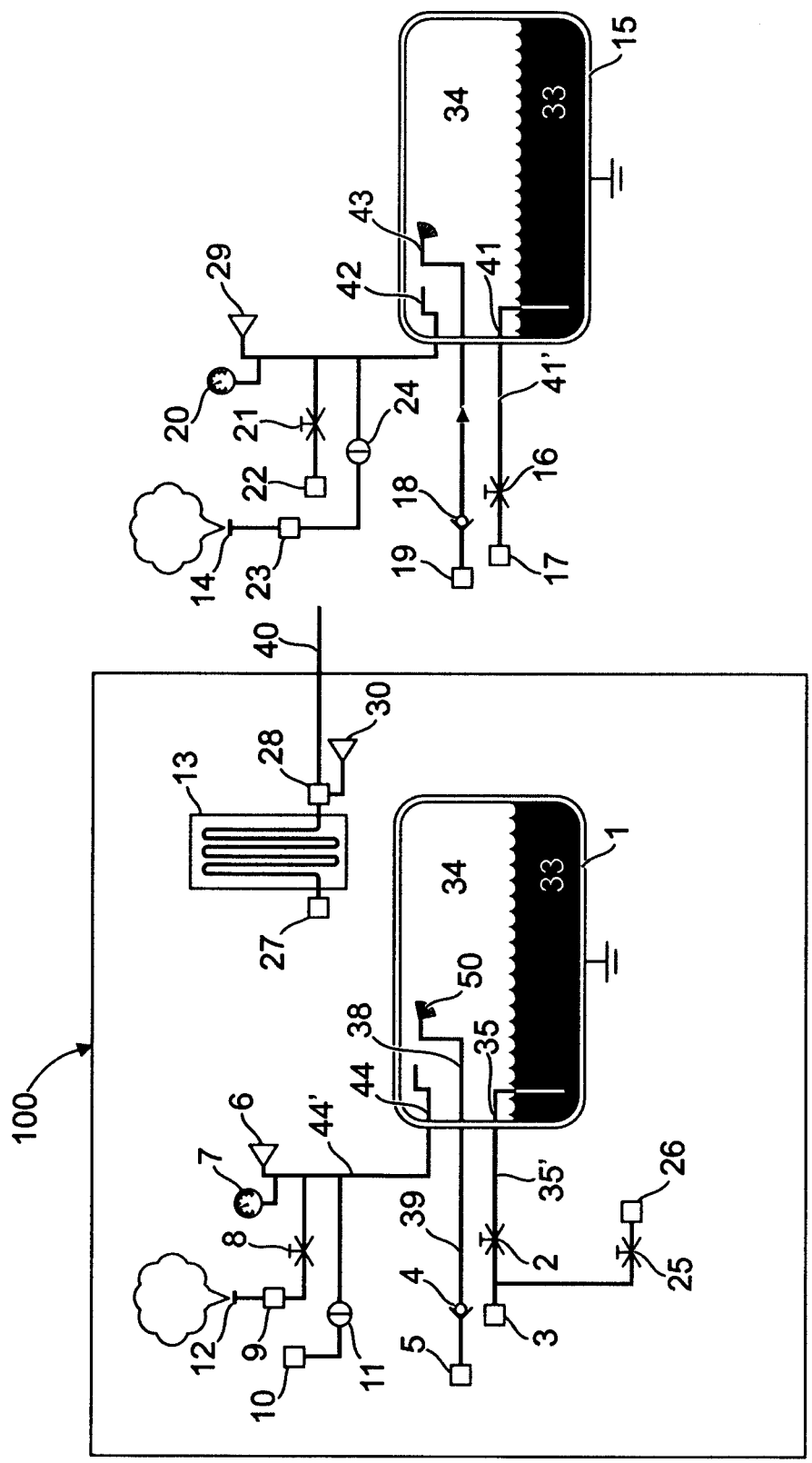
FIG. 1 shows a schematic view of a tool according to the invention.

FIG. 1 shows a tool 100 for draining and refilling a vehicle tank 15 for cryogenic fuel 33, wherein the tool 100 comprises a heat exchanger 13 and a cooling tank 1, said cooling tank 1 exhibiting an outlet 35 to a fuel outlet conduit 35' having at least one outlet valve 2, said fuel outlet 35 being connectable to a first fuel conduit and a second fuel conduit via the outlet valve 2 and a connecting device 3. The cooling tank 1 comprises a fuel inlet 38, which is connected to a fuel inlet conduit 39 via a check valve 4. The fuel inlet conduit 39 exhibits a connecting device 5 for connecting the fuel inlet 38 in the shown draining mode. In this mode, the fuel conduit 40 is connected to the heat exchanger 13 via a connecting means 28. The fuel conduit 40 is also adapted for connecting to the inlet 38 of the cooling tank 1 via a connecting means 5.

Fuel which is passed into one of the tanks 1, 15 is injected into the upper portion of the tank, for example by means of a spraying device 50 having a plurality of spraying orifices disposed along a conduit extending into the tank, to obtain a rapid cooling of the walls of tank. Accordingly, this means that there is fuel both in liquid form 33 and in vapour form 34 in the tanks. The outlet conduit 41' is connectable via a throttle valve 16 to the inlet conduit 39 via a connecting means 5 and via a throttle valve 32 to the fuel conduit 45, which via a connecting means 27 is connected to the inlet of the heat exchanger 13.

Accordingly, fuel is suitably injected into the cooling tank 1, the spraying device 50 is connected to the inlet 38 of the cooling tank for gaseous fuel inside the cooling tank 1, and the spraying device is thus adapted to spray fuel into the upper portion of the cooling tank 1.

Accordingly, in the tool 100, the heat exchanger 13 is provided with means 27 for connecting the inlet of the heat exchanger 13 to an outlet 41 for liquid fuel on a vehicle tank 15. A gas outlet 44 from the cooling tank 1 leads to a safety system for release of excess gas and is connected to one or several gas outlet conduits 44 via suitable valves and connecting devices, as is shown in the figures and is described herein.

As is shown in the figures, the outlet device 2, in the tool 100, can be disposed on a fuel outlet conduit 35' for liquid fuel from the cooling tank 1, wherein the fuel outlet conduit 35' divides into said first fuel conduit and said second fuel conduit downstream of the outlet valve 2, as viewed in the direction from the outlet 35 in the cooling tank 1.

As is shown in the figures, the gas outlet conduits are provided with safety valves, which are adapted to open automatically at an outlet pressure of 24 bars.

The gas outlet conduits are also provided with throttle valves 2, 16, which are adapted to be opened and closed manually.

The gas outlet 44 is disposed in the upper portion of the cooling tank 1, as is shown in FIG. 1. In a corresponding way, an outlet 42 for gaseous fuel is disposed in the upper portion of the vehicle tank 15 and leads to a safety system for discharge of excess gas. The gas outlet 44 in the cooling tank is via a conduit provided with a throttle valve 8 and a relief valve 9 to a discharge opening 12. Another conduit, which is connected to the outlet 44, exhibits a relief valve 11 connected to a valve pipe 10, and an additional pipe connected to the gas outlet 44 is connected to a safety valve 6 and to a pressure gauge 7.

In a corresponding way, in the vehicle tank there is seen an outlet 42 connected via a conduit to a relief valve 24 and to an admission pipe 23 to reach to an outlet opening 14, and furthermore a conduit connected to the outlet 42 and to a pressure gauge 20 and also a safety valve 29.

Figure 2:
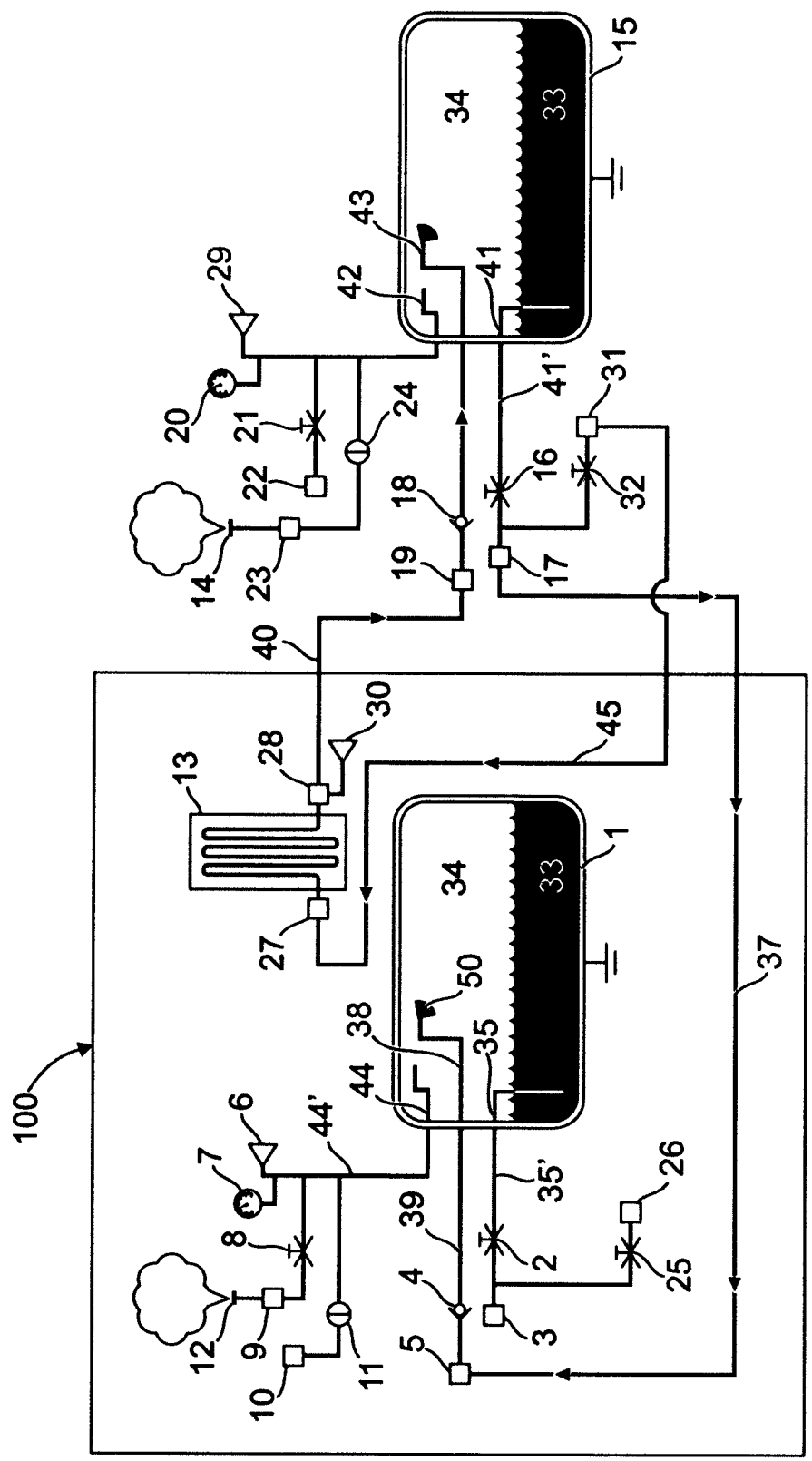
FIG. 2 shows a schematic view of a system according to the invention. In the figure, the system is shown in a draining mode.

In FIG. 2, the system of FIG. 1 is illustrated configured for draining the vehicle tank 15 of cryogenic fuel 33. The system is based on what has been described in FIG. 1 above. In order to drain the fuel tank 15 of fuel 33, the conduits are connected such that draining is enabled. The basic idea is that fuel 33 in the vehicle tank 15 is conducted to the heat exchanger 13, wherein the fuel 33 is transformed into gaseous form 34 and is returned to the vehicle tank 15, which is thereby pressurized. The increased pressure enables transfer of fuel 33 from the vehicle tank 15 to the cooling tank 1 via the fuel conduit 37. In order to enable the system to operate in a draining mode, the fuel inlet 38 on the cooling tank 1 is connected to the fuel inlet conduit 39 via the connecting means 5 to the fuel conduit 37, which in its turn is connected to the outlet conduit 41 from the vehicle tank 15 via a connecting means 17. Furthermore, the outlet conduit 41' is via the connecting means 27, 31 connected via a fuel conduit 45 to the heat exchanger 13, and via the connecting means 28, 19 and a fuel conduit 40 to an inlet 43 via a cheek valve 18. The outlet conduit 41' is connectable to the inlet conduit 39 via a throttle valve 16 and to the fuel conduit 45 via a throttle valve 32, which via connecting means 27 is connected to the inlet of the heat exchanger 13. By means of these connections, liquid cryogenic fuel 33 can be passed from the vehicle tank 15 through the fuel conduit 37 to the cooling tank 1 by the pressure increase caused by the vaporization in the heat exchanger 13 and by a portion of the fuel 33 being returned from the vehicle tank 15 via the heat exchanger 13 in gaseous form and injected into the vehicle tank 15 via the inlet 43 of the vehicle tank. Moreover, the inlet 43 is also the inlet for the normal refuelling of the vehicle.

The inlet 38 to the cooling tank 1 is placed above the fuel outlet 35 of the cooling tank in the vertical direction of the tool, and, as previously mentioned, there is a spraying device 50 spraying the fuel into the cooling tank 1.

The cooling tank can have various shapes, such as cylindrical or rectangular, and it can be horizontal or vertical and may assume different volumes. A cooling tank can be in the size range between, for example, 100-1200 litres, wherein 450 litres-498 litres is a preferred size and 600 litres is a particularly preferred size. The tank is suitably insulated, for example with polyurethane foam, to be able to maintain the low temperature.

Accordingly, the heat exchanger 13 is adapted to transform liquid fuel 33 into gas, which gas when transferred to the vehicle tank 15 expands while creating pressure in the vehicle tank 15, and thereby enables expulsion of fuel in liquid form 33 from the vehicle tank 15 to the cooling tank 1 through the fuel conduit 37. It is thus the pressure resulting from the liquid being transformed into gaseous form in the heat exchanger 13 which enables a transfer of liquid between the tanks. The pressure liar achieving a good expulsion of fuel has been found to be about 4-7 bars of normal working pressure.

Figure 3:
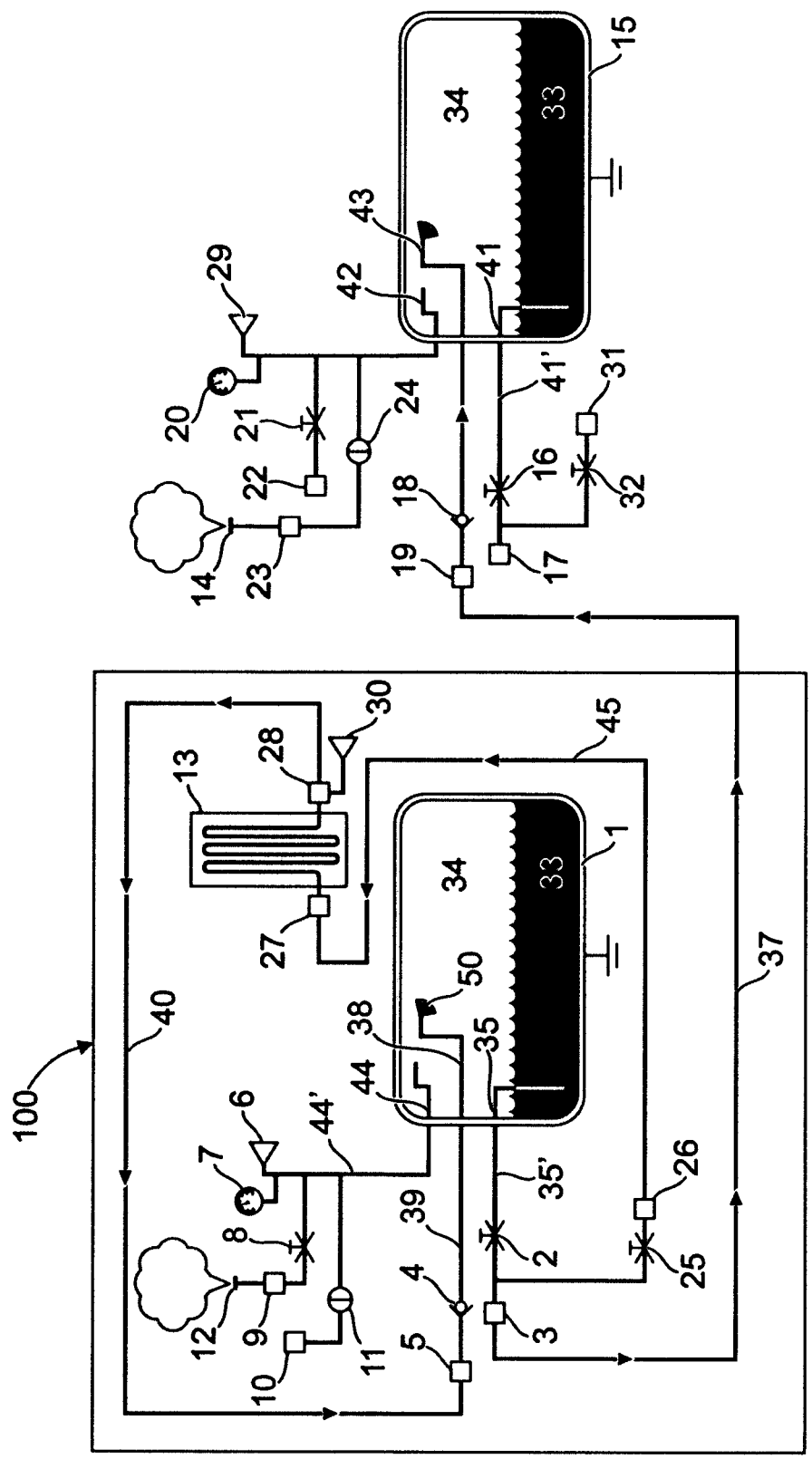
FIG. 3 shows a schematic view of a system according to the invention. In the figure, the system is shown in a refilling mode.

In FIG. 3, the herein described tool and system for draining and refilling a vehicle tank 15 is illustrated in a condition where fuel is returned from the tool 100 to the vehicle tank. In broad outline, in the condition for returning fuel to the vehicle tank 15, the heat exchanger 13 is connected to the cooling tank 1 via a fuel conduit 45 and liquid fuel 33 is taken from the cooling tank 1, is vaporized in the heat exchanger 13, and the vaporized fuel 34 is then returned to the cooling tank 1 via a fuel conduit 40 for increasing the pressure in the cooling tank 1. In more detail, the outlet 35 on the cooling tank 1 is connected to an outlet valve 2 for connecting the fuel conduit 37 via the connecting means 3. The fuel conduit 37, in its turn, is connected via a connecting means 19 and a check valve 18 to the inlet 43 of the vehicle tank 1 for the injection of fuel 34 into the vehicle tank 15. The outlet 35 from the cooling tank 1 is further connected via the outlet valve 2 and a throttle valve 25 to the fuel conduit 45 via a connecting means 26. This fuel conduit 45 transports liquid fuel 33 to the heat exchanger 13 via a connecting means 27 to the heat exchanger 13, wherein the fuel 33 is vaporized during passage through the heat exchanger 13 and is passed via a connecting means 28 mounted to the heat exchanger 13 to a conduit 40 for the now gaseous fuel 34. The conduit 40 is connected to the inlet 38 of the cooling tank via the connecting means 5 and the check valve 4. Accordingly, the heat exchanger 13 transfers fuel in gaseous form to the cooling tank 1 wherein a pressure is produced therein, which enables fuel to be expelled back from the cooling tank 1 to the vehicle tank 15. Accordingly, since the pressure in the cooling tank 1 is increased, fuel 33 is forced from the cooling tank 1 to the vehicle tank 15 through the fuel conduit 37 between the cooling tank 1 and the vehicle tank 15. The check valve 4 is adapted to open at a back pressure from the cooling tank 1 of from 12 to 24 bars, such as from 14 to 18 bars, preferably at a back pressure from the cooling tank 1 of 16 bars.

Suitably, both the cooling tank 1 and the vehicle tank 15 are grounded to prevent spark formation.

In order to further explain the invention, it is seen as a method for draining and refilling cryogenic fuel 33, 34 in a vehicle tank 15. The method comprises a plurality of steps, and can more specifically be described as a method for draining cryogenic fuel from a vehicle tank 15 for cryogenic fuel, wherein the method comprises the following steps:

A) providing a tool of the herein described kind comprising a cooling tank 1 and a heat exchanger 13;

B) forming a system of the herein described kind by connecting the tool to a vehicle tank 15, wherein one of the vehicle tank 15 and the cooling tank 1 of the tool constitutes a supplying tank containing cryogenic, pressurized fuel 33 for transfer to the other one of the vehicle tank 15 and the cooling tank 1 of the tool, which thereby constitutes a receiving tank;

C) transforming liquid cryogenic fuel 33 into gaseous form 34 by causing the liquid fuel 33 to pass through the heat exchanger 13 of the tool;

D) developing an expelling pressure in the supplying tank 1, 15 by injecting the fuel 33 transformed in the heat exchanger 13; and E) transferring fuel 33 from the supplying tank to the receiving tank, wherein the increased pressure in the supplying tank drives the transfer of fuel from the supplying tank the receiving tank.

In the above-described method, the vehicle tank can be the supplying tank and the liquid cryogenic fuel in step C) is taken from the vehicle tank via an outlet on the vehicle tank.

Alternatively, it can be the case that the vehicle tank is the supplying tank and the cooling tank of the tool is filled with a small amount of liquid cryogenic fuel, wherein the liquid cryogenic fuel in step C) is taken from the cooling tank of the tool via an outlet on the cooling tank of the tool.

The cooling tank of the tool can also the supplying tank and the liquid cryogenic fuel in step C) can be taken from the cooling tank of the tool via an outlet on the vehicle tank.

The working pressure in the supplying tank can be from 2 to 7 bars, such as from 3 to 5 bars, or 3 bars, and the pressure in the receiving tank is at least 1 bar lower than the pressure in the supplying tank, such as at least 2 bars lower than the pressure in the supplying tank.

The switching from draining mode to refilling mode can, purely mechanically, be described as if some fuel conduits are switching their respective connecting means. This can be illustrated in that:

The fuel conduit 37 is switched from connecting means 17 to 19.

The fuel conduit 45 is switched from connecting means 31 to 26.

The fuel conduit 40 is switched from connecting means 19 to 5.

The fuel is sprayed into the cooling tank 1, since the fuel in atomized form cools the tank. In order to maintain a sufficiently low temperature of, for example, about −160 degrees Celsius, of the cryogenic fuel 33, 34 in the system, the conduits are made of materials which can withstand the relative heat in the surroundings. The connections between the inlet, outlet and valves of the cooling tank 1 and the vehicle tank 15 are constituted by components which can be insulated.

As described above, the overpressure may have to be regulated if the temperature is raised so that the fuel 33 is transformed into gaseous fuel 34. The pressure can also be raised in the cooling tank 1 if a larger amount of liquid fuel 33 is supplied to the tank 1 than it can hold. To enable fuel 33 to be introduced from the vehicle tank 15, a corresponding amount has to be tapped from the tank at a steady rate. If the steady rate is disrupted, an overpressure may develop in the cooling tank 1. As is shown in the figures, the cooling tank 1 also comprises a valve 9 connected to the gas outlet 44 for regulating the overpressure from gaseous fuel 34.

The gas 34 vented through the valve 9 is usually released into the surroundings, but, alternatively, it can also be burned off.

In the figures, a plurality of valves of different kinds can be seen. The valves can be designed to be capable of receiving and forwarding fuel both in liquid form 33 and in gaseous form 34. It is also possible that some of the valves are designed for allowing passage of fuel 33, 34 in both of their directions. In another variant, different types of valves, one for the lower valves and one for the upper valves, are used. In the upper valves in the figures, gas is to be passed into the tanks, and through the lower valves, fuel in liquid form is passed out of the two tanks. The valve 8 is a throttle valve of manual type having an on/off position. Furthermore, the valve connections are adapted to enable injection of the gas into the tanks.

The connecting means 5 in connection with the cooling tank 1 and 19 in connection with the vehicle tank 15 are constituted by refilling valves to enable refilling of the tanks, whereas the valve 11 is constituted by a relief valve, which is opened and closed automatically at, for example, 16 bars.

The valves 6, 29 and 30 are constituted by safety valves, which are only pressure controlled and open when the system is used, whereas the valves 11 and 24 are relief valves.

To facilitate the work, the tool including the cooling tank 1 can be portable and movable, possibly by a pallet lifter. Preferably, the cooling tank is not larger than about 500 dm3, preferably 498 dm3, to enable it to be handled as desired. In some applications, it may be an advantage to divide the tank into two sub-tanks. To enable handling in the manner described above, the cooling tank suitably can have pallet-size base dimensions.

To further facilitate the process, one possibility is that the portable cooling tank is seen as part of the commercial vehicle. In that case, the portable cooling tank 1 can be attachable to the vehicle associated with the vehicle tank 15.

As a rule, the use of the cooling tank can be encouraged before servicing the vehicle. This is simplified if the cooling tank is easy to manage and easy to handle from an ergonomic point of view. It is also favourable if the cooling tank is stored in a suitable location. Therefore, the cooling tank could be located in a workshop, suitable for use in shop work.

Compressed Natural Gas (CNG) produces relatively few undesirable fumes and is also a comparatively safe fuel, since the gas weighs less than air and is dispersed rapidly by ventilation. CNG is usually stored in containers at a pressure of 200 to 248 bars. Owing to the above-mentioned properties, CNG is suited for use as fuel in a vehicle tank 15. Furthermore, it is possible to transfer CNG to a cooling tank 1 in the system according to the invention. The fuel in gaseous form can therefore be CNG in the above-described system for draining and refilling a vehicle tank 15.

Furthermore, in FIG. 3, it is seen that the cooling tank 1 has a predetermined, fixed shape. Thereby, also the amount of fuel in the tank can be determined. Furthermore, the cooling tank 1 can contain a predefined amount of fuel (LNG).

As previously mentioned, CNG is a gas which in liquid form turns into Liquefied Natural Gas (LNG).

Furthermore, at least one additional cooling tank can be used. In some situations, it may be advantageous to have two or more cooling tanks, for example when there is an unexpectedly large amount of fuel left in the tank, which is to be transferred to the cooling tank. In that case, a single cooling tank is sometimes not sufficient for storing the fuel during, for example, shop work. In addition to being used for shop work, the invention can also be used, for example, when refuelling at a filling station, or between two vehicles. This at least one additional cooling tank is smaller than the cooling tank 1.

The invention claimed is:

1. A tool for draining and refilling a vehicle tank for cryogenic fuel, wherein the tool when in position for use has a vertical direction and comprises a heat exchanger and a cooling tank, the cooling tank having an upper portion and a lower portion as viewed in the vertical direction of the tool and comprising a fuel outlet on the cooling tank having at least one outlet valve, the fuel outlet on the cooling tank being connected to a fuel outlet conduit, wherein the fuel outlet conduit comprises a first connector for connecting the fuel outlet on the cooling tank to an inlet on the heat exchanger, and wherein the fuel outlet conduit comprises a second connector for connecting the fuel outlet on the cooling tank to an inlet on the vehicle tank, and the cooling tank further comprises a cooling tank inlet, the cooling tank inlet being connected to a fuel inlet conduit via a check valve, and the fuel inlet conduit comprises a third connector for connecting the cooling tank inlet to an outlet of the heat exchanger, or to an outlet of the vehicle tank, and the outlet of the heat exchanger comprises a fourth connector for connecting to the inlet on the vehicle tank, wherein the heat exchanger is provided with a fifth connector for connecting the inlet on the heat exchanger to a fuel outlet on the vehicle tank such that the cryogenic fuel from the vehicle tank can be conducted to said heat exchanger and returned to the vehicle tank.

2. The tool according to claim 1, wherein the at least one outlet valve is disposed on the fuel outlet conduit, and wherein the fuel outlet conduit divides into a first fuel conduit and a second fuel conduit downstream of the at least one outlet valve, as viewed in a direction from the fuel outlet on the cooling tank.

3. The tool according to claim 1, wherein the check valve is adapted to open at a back pressure from the cooling tank from 12 to 24 bars.

4. The tool according to claim 1, wherein the cooling tank inlet to the cooling tank is placed above the fuel outlet from the cooling tank in the vertical direction of the tool.

5. The tool according to claim 3, wherein a spraying device is connected to the cooling tank inlet of the cooling tank inside the cooling tank, the spraying device being adapted for spraying the cryogenic fuel into the upper portion of the cooling tank.

6. The tool according to claim 1, wherein a gas outlet is disposed in the upper portion of the cooling tank.

7. The tool according to claim 6, wherein the gas outlet is connected via one or several valves to one or several gas outlet conduits.

8. The tool according to claim 6, wherein one gas outlet conduit is provided with a safety valve, which is adapted to open automatically at an outlet pressure of 24 bars.

9. The tool according to claim 6, wherein one gas outlet conduit is provided with an outlet valve, which is adapted to be opened and closed manually.

10. The tool according to claim 1, wherein the tool is portable.

* * * * *